H. W. ALDEN.
AUTOMOBILE DRIVING AXLE.
APPLICATION FILED MAY 12, 1921.
1,434,578.
Patented Nov. 7, 1922.
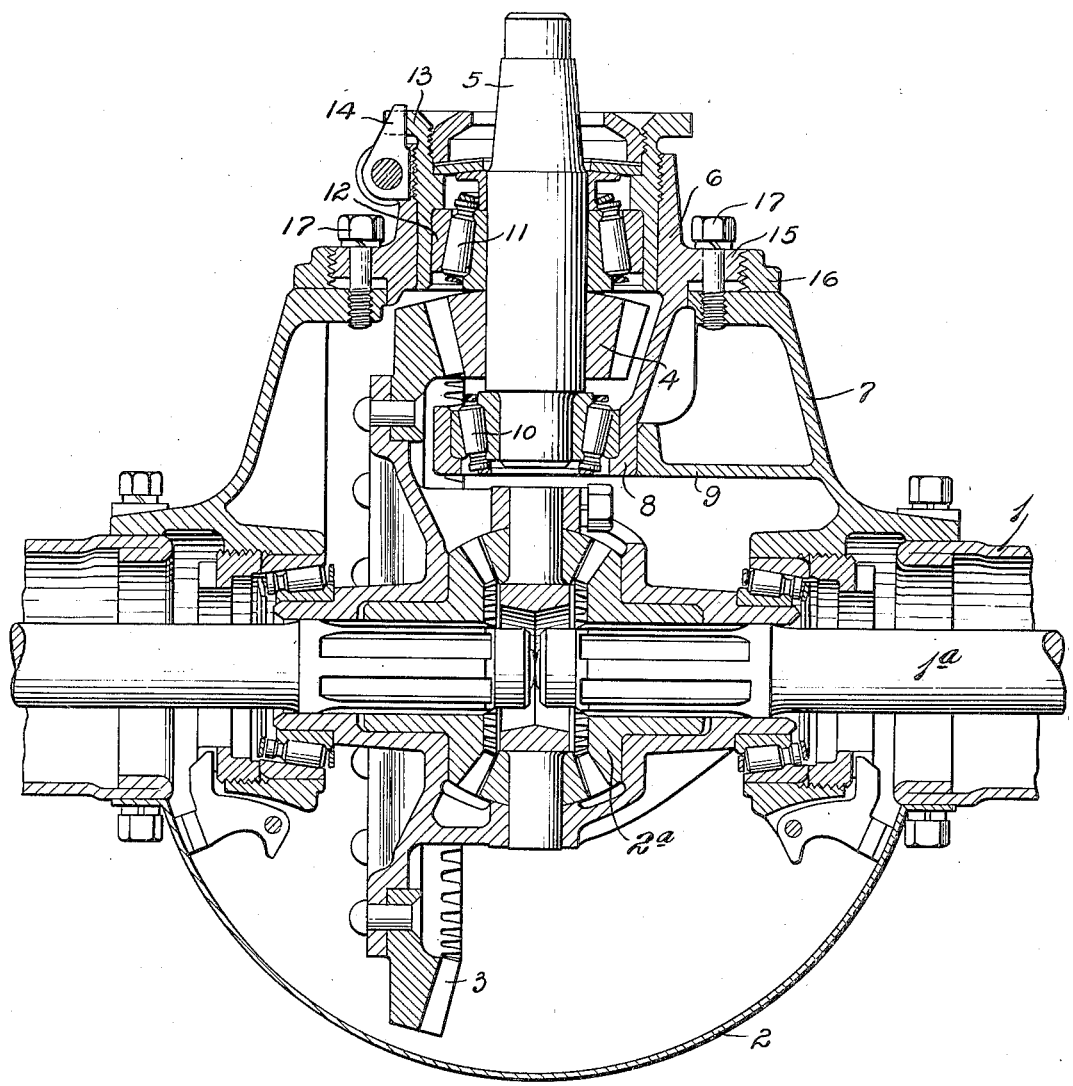
Inventor:
Herbert W. Alden,
by Cawett Cowen,
his Attorneys.

Patented Nov. 7, 1922.

1,434,578

UNITED STATES PATENT OFFICE.

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO.

AUTOMOBILE DRIVING AXLE.

Application filed May 12, 1921. Serial No. 469,007.

*To all whom it may concern:*

Be it known that I, HERBERT W. ALDEN, a citizen of the United States, and a resident of the city of Detroit, in the county of Wayne and State of Michigan, have invented a new and useful Improvement in Automobile Driving Axles, of which the following is a specification.

My invention relates to devices for supporting pinions or gears and has for its principal objects to make such a device that will permit easy and accurate adjustment of the pinion and its gear, that will reduce the amount of difficult and expensive machine work required and that will have a simple and compact construction.

In the ordinary type of bevel gear drive for automobiles, the construction comprises a housing that incloses the differential mechanism and driving shaft sections, and a propeller or pinion shaft disposed transversely to the axis of the housing and arranged to cooperate with the differential mechanism. In this type of construction, the main housing is commonly provided with a hollow projecting nosing in or on which is mounted the support or "cage" for the pinion shaft, said support being movable longitudinally to adjust the driving pinion relative to the main gear of the differential, so as to effect the proper engagement thereof. Heretofore the support for the pinion shaft has had screw threaded engagement with the nosing and for its proper adjustment has required the use of complicated screw thread devices; or the support has had a flange abutting against the nosing and for its proper adjustment has required the use of shims intervening between said flange and the nosing. In either case, the proper adjustment of the pinions and gear has required a considerable amount of skillful work to accurately fit a portion of the pinion support in the nosing, or has required expensive and complicated constructions.

The purpose of the present invention is to simplify the construction, to reduce the cost of manufacturing, to dispense with the use of shims with their attendant disadvantages of difficulty and slowness of adjustment, to facilitate the operation of assembling the parts, to cut down the amount of skilled work required for accurately alining the propeller shaft and greatly simplify the adjustment of the pinion support. It consists mainly in a threaded ring that works on the threaded periphery of the pinion shaft support and against the end of the housing, together with means for securing said support directly to the housing in the position determined by said ring. It also consists in the combinations and arrangements of parts hereinafter described and claimed.

The drawing which forms part of this specification represents my invention as imbodied in an automobile differential construction.

An automobile axle housing comprising tubular end members 1 in which are mounted the driven shaft section 1ª and an enlarged middle member or differential carrier 2, in which is mounted a differential mechanism 2ª. Said differential mechanism is provided with a suitable gear 3 for driving it. Said gear 3 meshes with a bevel gear or pinion 4 that is fixed on a propeller or pinion shaft 5 which projects into the differential carrier 2.

The pinion shaft 5 is rotatably mounted in a tubular support or cage 6 which has a portion fitting in a hollow nosing 7 on the differential carrier 2. Preferably the contacting parts of the periphery of the support 6 and the bore of the nosing 7 are machined to make an exact fit. The portion of said support 6 that projects into the housing preferably tapers and it is provided with an opening through which the gear 3 projects to mesh with the pinion 4. An annular seat 8 is provided in the end of said support for the end of the pinion shaft 5. A flange 9 projects from the differential carrier 2 and forms a brace or support for said seat 8. A suitable antifriction bearing 10, preferably a conical roller bearing, is interposed between the seat 8 and the end portion of the pinion shaft 5. A conical roller bearing 11 is also interposed between the pinion shaft 5 and the body portion of the pinion support 6. Preferably, the outer bearing member 12 of said roller bearing is mounted in a sleeve 13 in said support 6. A portion of the periphery of said sleeve 13 is threaded to cooperate with threads in said support 6, thus permitting movement of the sleeve 13 in said support and adjustment of said bearing 1. A locking pin 14 cooperates with notches in the flanged end of said sleeve 13 to lock it in position in said support 6.

The pinion shaft support 6 has a projecting annular rib or flange 15 which is threaded and on which is mounted a threaded ring 16. The end of the nosing 7 is made flat and its surface is preferably machined to fit the machined under surface of the ring 16. Preferably, the support is secured to the end of the housing by bolts or screws 17, that pass through holes provided therefor in the rib 15 and fit into threaded holes provided therefor in the nosing 7.

When it is desired to adjust the position of the pinion relative to the gear, the bolts 17 are loosened and the ring 16 turned in one direction or the other, thus moving the pinion carrier inward or outward, as is desired. When the ring is rotated in one direction, it bears against the face of the nosing and thus forces the pinion support outward; when said ring is rotated in the other direction, the ring moves away from the nosing, and by turning the bolts, the pinion support is moved inward. When the pinion is in proper position, the bolts 17 are tightened and the parts are securely held together.

The construction described has numerous advantages. It eliminates the necessity of interposing shims between the housing and the cage or support to change the adjustment of the pinion and gear. Adjustments are easily made and much finer adjustments are possible than where shims are used. Only a comparatively small portion of the tubular support is in contact with the bore of the housing and thus a great deal of machine work required in the constructions commonly used is eliminated. The ring and the end of the housing may be ground so as to be a perfect fit and this fit is not destroyed in making adjustments; whereas if shims are used, they are likely to be of different thicknesses at different points, and thus the support will not be firmly seated and it may be canted, causing it to bind in the nosing.

It is obvious that numerous changes may be made without departing from my invention and I do not wish to be limited to the precise construction shown.

What I claim is:

1. The combination with an automobile driving axle having a housing provided with a hollow projecting nosing, of a propeller shaft support mounted on said nosing and having a portion of its periphery screw threaded, said screw threaded portion overlapping said nosing, a threaded ring working on said screw threaded portion and adapted to bear against the end of the nosing, and means for securing said support and nosing together in adjusted relation.

2. The combination with an automobile driving axle having a housing provided with a hollow projecting nosing, of a hollow support for the driving shaft having a peripheral rib overlapping the end of said nosing, the peripheral portion of said rib being screw threaded, a threaded ring working on said screw threaded portion and adapted to bear against the end of the nosing, and means for securing said support and nosing together in adjusted relation.

3. The combination with an automobile driving axle having a housing provided with a hollow projecting nosing, of a hollow support for the driving shaft having a peripheral rib overlapping the end of said nosing, the peripheral portion of said rib being screw threaded, and a threaded ring working on said screw threaded portion and adapted to bear against the end of the nosing, and screws or the like extending through said rib into said nosing for securing said support and nosing together in adjusted relation.

4. In combination, a housing, shaft sections therein, a gear operatively connected with said shaft sections to drive the same, a second shaft in said housing disposed radially with respect to the first mentioned shaft, a gear on said second shaft adapted to mesh with and to drive said first gear, a tubular support for said second shaft disposed on said housing and projecting into the same, and means for moving said support inward or outward to effect the proper engagement of said gears, said means comprising a threaded rib on said tubular support and a mounting ring threaded to engage said rib and bearing flatwise against said housing.

5. The combination with an automobile axle having a housing with shaft sections and differential mechanism therein, of a propeller shaft operatively connected to said differential mechanism to actuate the same, said housing having a nosing, a tubular cage mounted on said nosing and supporting said propeller shaft said cage having a portion overlapping said nosing, and means for adjusting and holding said cage with respect to said nosing, said means comprising a screw threaded ring working on a screw thread on the portion of said cage overlapping the nosing and adapted to bear flatwise against the end of said nosing.

6. In combination, a housing having a hollow projecting portion with a flat end, a shaft in said housing, a gear operatively connected with said shaft to drive the same, a second shaft in said housing disposed radially with respect to the first mentioned shaft, a tubular support for said second shaft projecting into said housing, a gear on said shaft meshing with said first mentioned gear, said support having a transversely threaded portion and adjusting means comprising a mounting ring threaded to engage the threaded portion of said support and bearing endwise against the flat portion of said projection, and a sleeve mounted in said carrier so as to be adjustable lengthwise thereof, and a conical roller bearing interposed between said sleeve and said second shaft.

7. A propeller shaft carrying construction comprising a housing, a tubular shaft support mounted thereon, a propeller shaft in said support, said support having a transversely threaded portion overlapping said housing, a mounting ring threaded to engage the same and bearing endwise against said housing, a sleeve mounted in said support and movable lengthwise thereof, a roller bearing interposed between said sleeve and said propeller shaft and a roller bearing interposed between the end of said shaft and the end of said support.

8. The combination with an automobile driving axle having a housing provided with a hollow projecting nosing, of a pinion shaft support mounted on said nosing, a pinion shaft in said support, a pinion thereon, a gear meshing with said pinion, a second shaft operatively connected with said gear to be driven thereby, said pinion shaft support having a rib that is threaded on its periphery, a threaded ring working on said threaded rib and adapted to bear against the end of the nosing, and means for securing said support and nosing together in adjusted relation.

9. A propeller shaft carrying construction comprising a housing, a tubular shaft support mounted thereon, a propeller shaft in said support, said support having a transversely threaded portion overlapping said housing, a mounting ring threaded to engage the same and bearing endwise against said housing, a sleeve mounted in said support and movable lengthwise thereof, a roller bearing interposed between said sleeve and said propeller shaft, means for adjusting said bearing and a roller bearing interposed between the end of said shaft and the end of said support.

Signed at Detroit, Michigan, this 6th day of May, 1921.

HERBERT W. ALDEN.